Feb. 15, 1966  M. B. HOLLANDER  3,235,158
FRICTION BONDING METHOD AND APPARATUS
Filed Jan. 30, 1964  2 Sheets-Sheet 1

INVENTOR
MILTON BERNARD HOLLANDER
BY

ATTORNEY

Feb. 15, 1966   M. B. HOLLANDER   3,235,158.
FRICTION BONDING METHOD AND APPARATUS
Filed Jan. 30, 1964

INVENTOR
MILTON BERNARD HOLLANDER
BY

ATTORNEY

United States Patent Office 3,235,158
Patented Feb. 15, 1966

3,235,158
FRICTION BONDING METHOD AND APPARATUS
Milton Bernard Hollander, Stamford, Conn., assignor to American Machine & Foundry Company, a corporation of New Jersey
Filed Jan. 30, 1964, Ser. No. 341,362
12 Claims. (Cl. 228—2)

This invention relates in general to friction welding apparatus and, more particularly, to friction welding apparatus which delivers energy from a rotating mass to accomplish a friction weld.

An object of this invention is to provide a less costly, lighter, longer lived, faster operating and more versatile friction welding apparatus.

Another object of this invention is to provide, in a friction welding apparatus having a rotatable stationary chuck, and an axially slidable chuck movable towards the stationary chuck by hydraulic cylinders, a spindle bearing means for the spindle to support the rotating stationary chuck, the spindle bearing means not requiring heavy, expensive, low speed, and failure prone thrust bearings.

A further object of this invention is to provide, in an inertia friction welding apparatus having a motor with a given rated speed and having a spindle driven by the motor with a given ratio, means enabling the friction welding apparatus to accomplish friction welds with a wide range of initial spindle speeds.

Yet another object of this invention is to provide an inertia friction welding apparatus of a given capacity which may be operated with a reduced power cost.

An additional object of this invention is to provide, in a friction welding apparatus, means to counteract the great axial thrust exerted on the spindle of the apparatus.

Many other objects, advantages and features of invention reside in the particular construction, combination and arrangement of parts involved in the embodiment of the invention and its practice as will be understood from the following description and accompanying drawing wherein.

Figure 2:
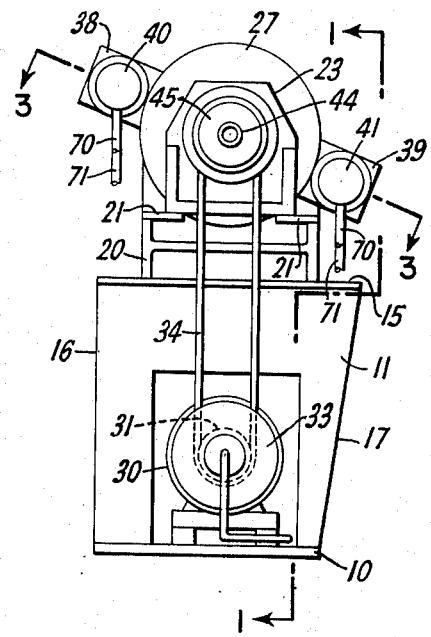
FIGURE 2 is an end elevational view of the friction welding apparatus of this invention.
Figure 4:
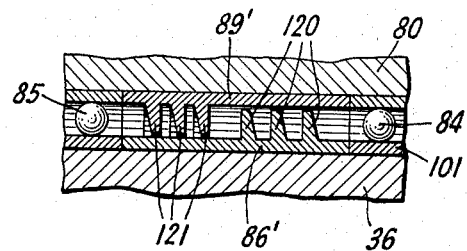
Figure 3:
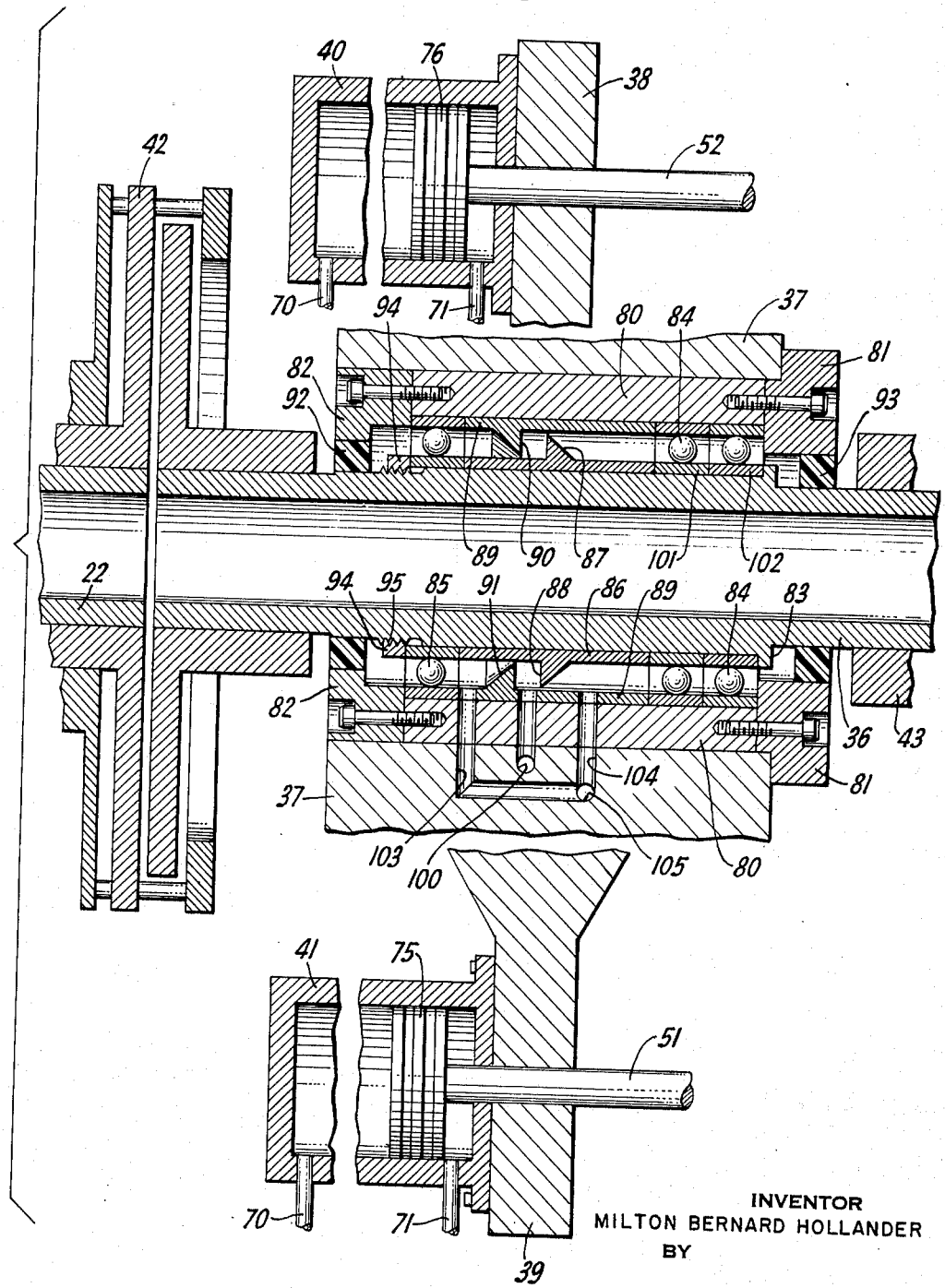

FIGURE 3 is a section taken on line 3—3 of FIGURE 2 through a fragment of the spindle showing the spindle support bearings and the spindle support bearing housing, the housing having intermediate portions of the cylinder support brackets broken away and having cylinders mounted on the cylinder support brackets with central portions of the cylinders broken away; and FIGURE 4 is a longitudinal section through a fragment of the spindle support bearing housing showing modified inner and outer thrust members.

Figure 1:
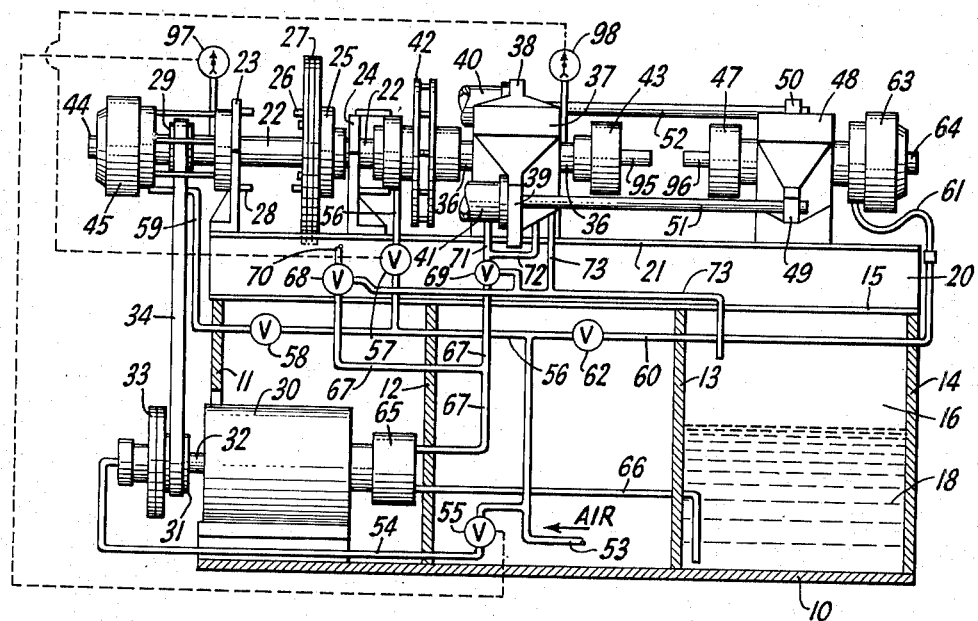
FIGURE 1 is a front elevation of a friction welding apparatus according to this invention with the base broken away in section as indicated by the lines 1—1 of FIGURE 2 and with the hydraulic cylinders broken away.

Referring to the drawing in detail, FIGURES 1 and 2 show the base plate 10 from which the transverse bulkheads 11, 12, 13 and 14 extend upward. An upper base plate 15 is fixed across the top of the bulkheads 11, 12, 13 and 14. At least bulkheads 13 and 14 have a rear wall 16 and a front wall 17 forming a reservoir for hydraulic fluid 18.

The upper base plate 15 supports the main frame member 20 of the friction welding apparatus. Member 20 is an H-beam having ways 21 fixed to it. A drive torque tube 22 is rotatably mounted above the main frame member 20 by means of bearings (not shown) in the drive torque tube bearing brackets 23 and 24 which are fixed to member 20. Torque tube 22 has a flange 25 fixed to it. Pins 26 projecting from flange 25 may be used to position disk shaped weights 27 which may be bolted in desired combinations of weight and rotational inertia to flange 25. If it is desired to reduce the rotational inertia of torque tube 22 and its associated elements, a desired number of weights 27 may be unbolted when not in use from flange 25 and rested on the pins 28 projecting from the drive spindle bracket 23.

Mounted on the headstock end of torque tube 22 is a pulley 29. An electric motor 30 is mounted on base plate 10 and has a pulley 31 rotatably mounted on its shaft. An air clutch 33 may be activated so that shaft 32 rotates pulley 31. A belt 34, or any other equivalent drive means, enables pulley 31 to rotate pulley 29 and thereby torque tube 22.

A spindle 36 is rotatably mounted within a housing 37 in a manner which will be hereafter described. Extending laterally and inclined at an angle from the horizontal are the cylinder support brackets 38 and 39 to which the hydraulic cylinders 40 and 41 are attached. An air clutch 42 is mounted on the butted ends of torque tube 22 and spindle 36 so that the torque tube 22 may rotate the spindle 36. Mounted on the front end of spindle 36 is a workpiece holding chuck 43 which may be of the draw-bar actuated type. If chuck 43 is of the draw-bar actuated type, a draw-bar 44 may extend through the torque tube 22 and the main spindle 36. The draw-bar 44 may be actuated by a pneumatic mechanism 45 which is mounted beyond the end of drive spindle 22 on the drive spindle bearing bracket 23.

Referring further to FIGURE 1, the tailstock chuck 47 is fixed to a tailstock slide 48 which is slidably mounted on the ways 21 of the main frame member 20. Extending from the tailstock slide 48 are the brackets 49 and 50 to which are fastened the piston rods 51 and 52 extending from the hydraulic cylinders 40 and 41.

A source of air under pressure is connected to tube 53. Line 54 conducts air from tube 53 through control valve 55 to the air clutch 33 mounted on shaft 32 of motor 30. Thus the actuation of valve 55 operates air clutch 33. Tube 56 leads from tube 53 through valve 57 to activate air clutch 42. Valve 58 in line 59 controls air to activate the pneumatic mechanism 45 which activates draw-bar 44. Line 60, having a flexible end portion 61, has the flow of air through it regulated by valve 62. The flexible end portion 61 of line 60 is connected to a pneumatic mecahnism 63 which activates a draw-bar 64 to operate chuck 47. While draw-bar actuated clutches 43 and 47 have been shown, any chucks, whether air activated or not, may be used.

A hydraulic pump 65 is mounted on the other end of motor 30. Pump 65 draws hydraulic fluid 18 from the hydraulic fluid compartment through line 66. Hydraulic fluid from pump 65 under pressure passes through lines 67 to the three way valves 68 and 69. Valves 68 may direct hydraulic fluid through lines 70 which extend to the rearmost ends of cylinders 40 and 41. Valve 69 may be activated to conduct hydraulic fluid under pressure through lines 71 to the front ends of cylinders 40 and 41. A line 72 also conducts hydraulic fluid flowing through valve 69 into the main spindle housing 37 in a manner which will be described. The hydraulic fluid drain lines 73 return hydraulic fluid from the three way valves 68 and 69 to the hydraulic fluid reservoir and, in addition, the hydraulic fluid drain lines 73 drain hydraulic fluid from the main spindle housing 37 in a manner which will be described.

Referring now to FIGURE 3, it may be seen that the hydraulic cylinders 40 and 41 contain the pistons 75 and 76 from which the rods 51 and 52 extend through the brackets 49 and 50. Within the spindle housing 37 there is disposed a cylindrical inner member 80 which has an end ring 81 bolted to it. End ring 81 slightly overlaps the spindle housing 37 to prevent thrust from chuck 43 moving the cylindrical inner member 80 to the left as shown. The other end of the inner member 80 has an end ring 82 bolted to it. The main spindle 36 has an annular ring 83 formed on it. A pair of ball bearings 84 rest adjacent to each other and against the annular ring 83. The ball bearings 84 and a third ball bearing 85 rotatably support the main spindle 36 within the spindle housing 37 and the cylindrical inner member 80.

An inner thrust member 86 is disposed about spindle 36 between bearings 84 and bearing 85. This inner thrust member 86 has an annular projection 87 extending outward from it having a rearwardly facing shoulder 88. An outer thrust member 89 has an inwardly extending annular projection 91 having a forwardly facing shoulder 90. Ring-type seals 92 and 93 extend between main spindle 36 and the end rings 81 and 82. An internally threaded locking nut 94 engages a suitably threaded portion 95 of spindle 36 so that lock nut 94 may be turned forward against bearing 85.

This invention operates in the following manner. Workpieces 95 and 96 are secured in the chucks 43 and 47 by activating valves 58 and 62. Motor 30, which should be a motor which delivers a relatively high torque at low speeds, is started. Valves 55 and 57 should be activated to engage the air clutches 33 and 42. Motor 30 then drives the torque tube 22 and the main spindle 36. Selected weights 27 should already have been bolted to flange 25 to supply sufficient inertia to accomplish the friction weld.

If it is desired to accomplish a given friction weld with an initial lower speed of revolution of the rotating chuck 43, a tachometer 97 may be mounted to register the r.p.m. of the torque tube drive 22. Tachometer 97 may be set to open a pair of electrical contacts, or any other control means, at any desired r.p.m. Valve 55 may be a solenoid valve or any other valve responsive to the control means activated in tachometer 97. Therefore, as an example, if motor 30 would normally drive torque tube 22 and chuck 43 at 3600 r.p.m., tachometer 97 may be set at a desired r.p.m. of 2200. Then as valve 55 is activated to engage clutch 33, motor 30, through clutch 33, starts to rotate torque tube 22. When torque tube 22 attains a speed of 2200 r.p.m., tachometer 97 closes electrical contacts or other control means (not shown) to activate valve 55 and disengage clutch 33. As torque tube 22 gradually falls below a desired speed which is set in tachometer 97, as an example 2150 r.p.m., control means in tachometer 97 again activate valve 55 to engage clutch 33. Thus it may be seen that, without any variable ratio drive means, the friction welding apparatus of this invention may be used to accomplish friction welds with any desired initial speed of the rotating workpiece.

When chuck 43 and workpiece 95 are rotating at a desired speed, valve 69 is activated to conduct hydraulic fluid under pressure from tube 67 into tubes 71 to urge pistons 75 and 76 rearwardly and draw the workpieces 95 and 96 toward each other. Meanwhile, three-way valve 68 is set to drain fluid from the other ends of cylinders 40 and 41 through tube 73 into the hydraulic reservoir. When the relatively rotating workpieces contact each other, they are pushed together with a desired large force to accomplish a friction weld. As the workpieces 95 and 96 come together, valve 55 is activated to disengage clutch 33. Rotational inertia from the disk shaped flywheels 27 and other rotating elements associated with torque tube 22 and main spindle 36 is given up in the area of contact between the workpieces generating heat. As the flywheels 27 rapidly decelerate, tachometer 98 on main spindle 36 may be set to activate valve 57 when the speed of chuck 43 and flywheels 27 falls below a desired minimum speed. Thus clutch 42 may be disengaged during a welding cycle, leaving the flywheels 27 to continue rotating with a speed of, for example, 500 r.p.m. Spindle 36 and chuck 43 will then come to a stop as the workpieces 95 and 96 are continued to be forced together to complete the weld.

Valves 62 and 58 may be activated to remove the welded workpieces 95 and 96 and secure additional workpieces in the chucks to be welded after the three-way valve 68 is activated to direct hydraulic fluid into tubes 70 to extend the rods 51 and 52 from cylinders 40 and 41 and move the chuck 47 away from chuck 43. Since the flywheels 27 are still rotating at a relatively slow speed, clutches 33 and 42 may be engaged to again bring chuck 43 up to a desired initial friction welding speed. Motor 30 thus does not have to start accelerating a large mass from rest. Because most electric motors have characteristics wherein they draw very high currents when starting under heavy loads from zero r.p.m., using tachometer 98 to disengage clutch 42, leaving flywheels 27 rotating at a low r.p.m., enables an electric motor 30 to be used more efficiently. Further, if a rotating mass gives up energy between the speeds of 3000 down to 1000 r.p.m., 8/9 of the energy stored in the rotating mass will be delivered to a weld. Thus this feature of the invention does not necessitate any significant increase in the rotating mass.

Also, it is possible to engage clutch 33 and charge flywheels 27 while clutch 42 is disengaged, thereby permitting workpieces 95 and 96 to be withdrawn from stopped chucks 43 and 47 and at the same time, recharge flywheels 27 to reduce the cycle time.

Referring now to FIGURES 1 and 3, as the workpieces 95 and 96 are forced together, a great axial load is placed on spindle 36. Normally, this would require the provision of large, heavy duty, low speed, costly thrust bearings within the spindle housing 37. However, three-way valve 69 directs fluid into cylinders 40 and 41 through tube 71 and, at the same time, it directs fluid through tube 72 which communicates with the channel 100 in housing 37. Channel 100 extends through the cylindrical inner member 80 and the inner thrust member 86 to emerge between the two shoulders 88 and 90 of the inner and outer thrust members 86 and 89.

The inner and outer thrust members 86 and 89 are made so that the total surface area of shoulder 88 is equal to the total working area of the pistons 75 and 76. In the embodiment of the invention shown, the effective working area of pistons 75 and 76 is the area of the piston faces less the area of the rods 51 and 52. Therefore, as greater and greater hydraulic pressure is delivered through valve 69 through pipes 71 and 72, the force exerted in tension on the rods 51 and 52 is exactly balanced by the force exerted by the hydraulic fluid on shoulder 88. The force exerted on shoulder 88 is transmitted through the inner thrust member to the inner races 101 and 102 of the ball bearings 84. This thrust is then taken up by the annular ring 83 so that axial loads on spindle 36 are exactly counteracted and balanced. Thus the balls in bearings 84 and 85 do not need to bear any axial loads.

The annular projections 87 and 91 are formed so that they extend to the outer thrust member 89 and the inner thrust member 86 with slight clearance. The annular projections 87 and 91 taper to an edge to reduce rotational drag on spindle 36. Hydraulic fluid flowing past these clearances drains through the drain channels 103 and 104 to pass out through channel 105 which is connected to drain tube 73 shown in FIGURE 1.

The particular construction of housing 37 is such that end ring 82 and seal 92 may be removed after which lock nut 94 is backed off the threads 95. Ball bearing 85 and the inner and outer thrust members may then be removed and differently formed inner and outer thrust members substituted for them. The substituted inner and outer thrust members may provide a gerater or smaller area between shoulders 88 and 90. Thus, if it is desired, the hydraulic cylinders 40 and 41 may be changed for cylinders having a greater or lesser capacity. Matching inner and outer thrust members may be provided to be easily installed to balance the thrust of any given pair of cylinders. After installing new inner and outer thrust members, lock nut 94 is replaced and tightened against bearing 85. End ring 82 and sealing ring 92 are then replaced.

While this invention has been described as using hydraulic fluid to operate the cylinders 40 and 41 and to counteract axial thrust on spindle 36, it is to be understood that air could be used in place of the hydraulic fluid if desired.

FIGURE 4 shows a modification of the inner and outer thrust members 86 and 89. The modified inner and outer thrust members, designated 86' and 89', respectively, are placed between the bearings 84 and 85. The inner thrust member 86' has a number of annular projections 120 which extend with slight clearance toward the outer thrust member 89' and the outer thrust member has a number of inwardly projecting annular projections 121 which extend toward the inner thrust member 86'. The plurality of projections 120 and 121 reduces the flow of fluid under pressure past them. Thus reduction of flow past the projections 120 and 121 lowers the required power output of pump 65. It is further to be understood that, in some applications, ring type seals may be provided between a projection from the inner thrust member and the outer thrust member and between a projection from the outer thrust member and the inner thrust member.

While this invention has been shown and described in the best form known, it will nevertheless be understood that this is purely exemplary and that modifications may be made without departing from the spirit and scope of the invention except as it may be more limited in the appended claims.

What is claimed is:

1. In a friction welding machine having a rotating chuck, a spindle on which said rotating chuck is fixed, a housing, bearing means rotatably supporting said spindle within said housing, a second chuck, and means urging said second chuck and said rotating chuck towards each other to accomplish a friction weld; means counteracting axial thrust exerted on said spindle comprising, in combination, an annular projection fixed to said spindle extending outward from said spindle, a cylindrical inner surface of said housing disposed about said annular projection, means extending inward from said cylindrical inner surface toward said spindle, said annular projection fixed to said spindle being disposed between said rotating chuck and said means extending inward from said cylindrical inner surface, and means introducing fluid under pressure between said annular projection and said means extending inward from said cylindrical inner surface as said chucks are urged together.

2. In a friction welding machine having a rotating chuck, a spindle on which said rotating chuck is fixed, a housing, bearing means rotatably supporting said spindle within said housing, a second chuck, and means urging said second chuck and said rotating chuck towards each other to accomplish a friction weld; means counteracting axial thrust exerted on said spindle comprising, in combination, at least one annular projection fixed to said spindle extending outward from said spindle, a cylindrical inner surface of said housing disposed with slight clearance about said annular projection, means extending inward from said cylindrical inner surface toward said spindle, said spindle having slight clearance from said means extending inward from said cylindrical inner surface, said annular projection fixed to said spindle being disposed between said rotating chuck and said means extending inward from said cylindrical inner surface, and means introducing fluid under pressure between said annular projection and said means extending inward from said cylindrical inner surface as said chucks are urged together.

3. The combination according to claim 2 wherein said means introducing fluid under pressure introduces a hydraulic fluid flowing past said annular projection and said means extending inward from said cylindrical inner surface.

4. The combination according to claim 2 wherein said at least one annular projection consists of a number of spaced annular projections each having an outer edge of small width, and wherein said means extending inward from said cylindrical inner surface consists of a number of spaced annular projections extending inward from said cylindrical surface each having an inner edge of small width.

5. A friction welding apparatus having a first chuck, a spindle on which said first chuck is mounted, a housing, bearing means rotatably supporting said spindle within said housing, means for rotating said spindle, a second chuck, a source of hydraulic fluid under pressure, hydraulic cylinders, means connecting said hydraulic cylinders to said source of hydraulic fluid under pressure urging said second chuck toward said housing and said first chuck to accomplish a friction weld, an annular projection fixed to said spindle extending outward from said spindle, a cylindrical inner surface of said housing disposed with slight clearance about said annular projection, and means extending inward from said cylindrical inner surface toward said spindle with slight clearance between said means extending inward and said spindle, said annular projection fixed to said spindle being disposed between said first chuck and said means extending inward from said cylindrical inner surface, said means connecting said hydraulic cylinders to said source of hydraulic fluid under pressure conducting hydraulic fluid from said source of hydraulic fluid under pressure between said annular projection and said means extending inward from said cylindrical inner surface.

6. The combination according to claim 5 wherein said annular projection extending outward from said spindle terminates in an edge of small width disposed with slight clearance from said cylindrical inner surface.

7. The combination according to claim 6 wherein said means extending inward from said cylindrical inner surface terminates in an edge of small width disposed with slight clearance from said spindle.

8. The combination according to claim 5 with the addition of first clutch means through which said means rotating said spindle rotates said spindle, and with the addition of flywheel masses connected to said spindle rotating with said spindle.

9. The combination according to claim 8 wherein said means rotating said spindle is an electric motor, and with the addition of second clutch means connecting said flywheel masses to said spindle, first speed sensing means responding to a given low speed of rotation of said spindle disengaging a second clutch means, and second speed sensing means responding to a given higher speed of rotation of said flywheel masses disengaging said first clutch means.

10. In a friction welding apparatus, a first rotatably mounted chuck, a second chuck, means moving said chucks toward each other, an electric motor, rotatably mounted flywheel masses, first clutch means connecting said electric motor to said flywheel masses, second clutch means connecting said flywheel masses to said first chuck, first speed sensing means responding to a given low speed of rotation of said first chuck disengaging said second clutch means, and second speed sensing means responding to a given higher speed of rotation of said flywheel masses disengaging said first clutch means.

11. A friction welding apparatus having a first chuck, a spindle on which said first chuck is mounted, said spindle having an annular ring, a housing, a cylindrical inner surface of said housing, at least one first ball bearing having inner and outer races disposed about said shaft adjacent to said annular ring of said shaft, an inner thrust member disposed about said spindle adjacent to said at least one ball bearing, an outer thrust member disposed within said cylindrical surface adjacent to the outer race of said at least one first ball bearing, said inner thrust member having an outwardly extending annular projection extending with slight clearance from said outer thrust member and said outer thrust member having an inwardly extending annular projection extending with slight clearance from said inner thrust member, said annular projection of said inner thrust member being disposed between said annular inward projection of said outer thrust member and said at least one first ball bearing, a second ball bearing having inner and outer races disposed adjacent to said inner and outer thrust members, the outer races of said at least one first and said second ball bearings being restrained against axial motion within said housing, a slidably mounted second chuck, a source of hydraulic fluid under pressure, hydraulic cylinders connected to said housing and said second chuck, means connecting said source of hydraulic fluid under pressure to said hydraulic cylinders and conducting the hydraulic fluid under pressure into said housing between said outward and inward annular projections of said inner and outer thrust members, pistons within said hydraulic cylinders having effective piston face areas on which hydraulic fluid acts drawing said second chuck toward said housing to accomplish a friction weld, said outward annular projection of said inner thrust member having an area facing said inward annular projection of said outer thrust member which area is substantially equal to the sum of the effective piston face areas of said pistons, axial thrust on said first chuck being balanced by axial thrust exerted by hydraulic fluid on said outward annular projection of said inner thrust member and being transmitted through said inner thrust member and the inner race of said at least one first ball bearing to said annular ring of said spindle, and motor means to rotate said spindle.

12. A method of friction welding comprising fixing two workpieces in juxtaposed axially aligned chucks, moving the workpieces into contact with each other, rotating the workpieces relative to each other by force transmitted through a first clutch connected to a flywheel mass and a second clutch connecting said flywheel mass and one workpiece, sensing the rotational speed of said flywheel mass, disengaging said first clutch in response to a selected detected speed of said flywheel mass, and thereafter disengaging said second clutch in response to detection of a speed including stopping lower than said selected speed.

No references cited.

JOHN F. CAMPBELL, *Primary Examiner.*

WITMORE A. WILTZ, *Examiner.*